June 2, 1964

B. O. WHEELEY 3,135,647

SELF-ADHERING DECORATIVE SURFACE TILES
AND METHOD OF MAKING THE SAME

Filed Dec. 16, 1960

INVENTOR.
B. OTTO WHEELEY
BY
Oscar B. Brumback
his
ATTORNEY

United States Patent Office 3,135,647
Patented June 2, 1964

3,135,647
SELF-ADHERING DECORATIVE SURFACE TILES AND METHOD OF MAKING THE SAME
Benton Otto Wheeley, Canonsburg, Pa., assignor to Koppers Company, Inc., a corporation of Delaware
Filed Dec. 16, 1960, Ser. No. 76,356
10 Claims. (Cl. 161—236)

This invention relates generally to decorative surface tiles and more particularly it relates to an improved self-adhering decorative floor tile.

Hard surfaced floor coverings in use today are made from many different materials, for example, linoleum, polyvinyl chloride and copolymer resins, cork, asphalt, rubber, wood, and the like. The shaping of these materials into tiles of various lengths and widths has made their application to any type of surface a mechanically simple operation. As a result, individuals who are not expert tile setters can place a new surface on the floors of homes and other such buildings.

Heretofore, the laying or application of a decorative floor tile has involved a two or three step process. Depending on the surface to be coated, it was necessary to apply a thin coat of linoleum paste or the like to the flooring followed, after a lengthy drying period, by a second coat and then placing the floor tile in position. The aforementioned method is laborious and time consuming and is not practical on below grade flooring because the adhesive will lose its tenacity due to bacterial or moisture attack. Also, even though some of the materials useful as floor tiles offer excellent resistance to water and alkali, the use of separate pastes and cements prevent formation of a complete vapor barrier between the tile and the coated surface.

The present invention provides a novel combination of decorative floor tile and self-adhering cement whereby the self-adhering tile, after removal of a release paper, may be immediately set in position forming an instant bond with a substrate surface which bond is at the same time an excellent vapor barrier.

The tiles of the present invention, therefore, eliminate the disadvantages of the tiles heretofore used to apply a permanent decorative covering on conventional surface materials.

There is no longer need for special tools or separate pastes to apply a complete tile floor covering or to apply other materials, such as ceramic materials, to walls. It is now possible to simply remove a particular release paper from the underside of my preformed tile and drop the tile into position on the surface to be coated. Immediately upon contacting the coated surface with the novel tile of this invention, a permanent vapor proof bond is formed. Because of the immediate bond formed, it is no longer necessary to wait for any extensive drying period prior to subjecting the tiles to normal use.

The decorative tiles when applied to floor or wall surfaces will not cause the adhesive to overlap or seep out through abutting sides of tiles when they are put in place. The pressure applied to the tile when it is dropped in place forces only the amount of composition adhesive necessary to give an excellent bond between adjoining tiles. The need of a special cleaner to remove excess adhesive is eliminated and the decorative surface of the tile is not marred by any drying or crusty adhesive material. The bituminous adhesive retains sufficient tack to adhere to any surface such, for example as wood, steel, concrete, and the like. The ability of this adhesive bituminous composition to maintain its tack, though only covered with a release paper, is surprising in view of the fact that commercial tile cements must be maintained in a completely air free atmosphere, otherwise they dry out and lose their effectiveness.

The decorative material used with the present invention may be any of the well known materials used commercially today, such as vinyl, rubber, asphalt, cork, linoleum, ceramic, and the like.

The novel adhesive compositions necessary to obtain the required instantaneous bond of this invention are described in detail in copending applications filed concurrently herewith and assigned to the assignee of this invention.

Briefly, the adhesive composition as described in the concurrently filed application Serial No. 76,185 of John J. Lane and Lawrence F. Flaherty comprises a solution of coal and an acrylonitrile butadiene copolymer dissolved in a mixture of coal tar pitch and high boiling aromatic oil. In general, this composition comprises from 28–35% coal tar pitch, 40–47% heavy creosote oil, 20–48% coal, 1–25% synthetic rubber and sufficient filler such as clay, carbon black, and the like to control the tackiness of the compositions.

As a specific example of the coal tar pitch composition used in this invention, 40 parts of high boiling aromatic oil are added to 30 parts of coal tar pitch. Temperature of this mixture is raised to 350° F. and 40 parts of pulverized coal added. The mixture is then placed in an agitated still and heated to a temperature of 600° F. and held at this temperature until the coal dissolves. The mixture is then cooled to 300° F. and 5 parts of a medium weight copolymer of butadiene acrylonitrile in a 75:25 ratio added. The mixture is then maintained at 300° F. for four hours after which 50 parts of ball clay are added and mixed for three hours. The product has the characteristics of a black heavy creamy material having a viscosity while hot at 250° F. using a Brookfield viscometer of between 20,000 and 40,000 centipoises.

The adhesive composition as described in the concurrently filed application Serial No. 76,357 of John J. Lane and B. Otto Wheeley comprises a solution of asphalt, butyl rubber and high boiling petroleum oil. In general this composition comprises from 40–80% asphalt, 2–25% butyl rubber, 2–25% petroleum oil and 0–30% of a filler material such as clay, carbon black and the like which filler may be added to control the tackiness of the composition. As a specific example of the asphalt composition used in this invention, 12 parts of butyl rubber are added to 100 parts of 85–100 penetration asphalt at 300° F. and agitated until the butyl dissolves, one hour. To this is added 6 parts of high boiling petroleum oil and with the temperature maintained at 300–325° F. mixed until solution occurs (two hours). To this is added 32 parts of ball clay and agitated until the clay is completely dispersed. The resultant product has a Brookfield viscosity at 250° F. using 12 r.p.m. and No. 4 spindle of 8,000 to 20,000 cps. and a penetration at 77° F., 100 gm., 5 seconds of 50–90 mm. (ASTM D–5).

The release or removable paper used as one of the compounds of the novel tile of this invention advantageously secures a weak bond with the above described bituminous adhesive compositions making its removal therefrom relatively easy. The purpose of the release paper is to protect the adhesive composition from completely drying during exposure to air. The thus protective coating provided by the release paper permits the adhesive composition to maintain the necessary tack required to secure the excellent permanent bond to whatever substrate it is applied.

The above novel features of the invention will appear more fully when the same is read in connection with the accompanying drawings. It is to be expressly understood, however, that the drawings are not intended as a definition of the invention but are for the purpose of illustration only.

The novel decorative floor tile is prepared by applying a thin film of a novel composition of an adherent bituminous composition which is described in detail in two copending applications of Lane et al., and Wheeley et al., filed concurrently herewith to the backing of a selected tile, and covering said bituminous composition with a release paper. Alternately, the bituminous composition can be first applied to the release paper and subsequently bonded to the tile materials.

The tile or linoleum base is coated with the novel bituminous adhesive so that air surfaces and voids are substantially filled with the adhesive material. Before or after surfacing with the bituminous material, the tile or linoleum may be cut into individual or strip tiles. The bituminous adhesive surface can then be masked with a release paper such as the silicone paper produced by the KVP Paper Company and then the completed self-adhering tile packaged for commercial sale. To apply the tile it is only necessary to remove the release paper backing and drop the tile in place on any floor surface. A decorative floor tile element which is substantially waterproof is thus produced.

Figure 1:
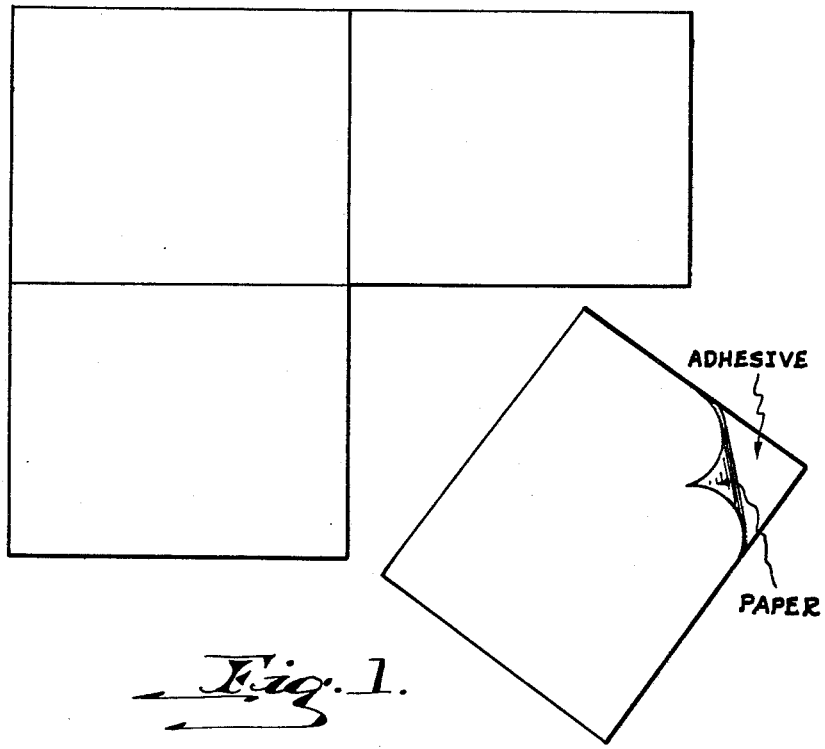
FIGURE 1 is a surface view of finished tiles embodying the invention in which the method of removing the protective paper is shown.
Figure 2:
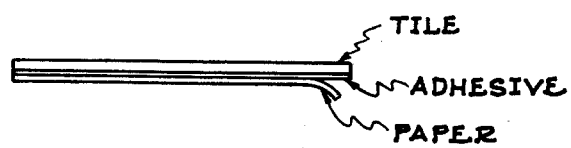
FIGURE 2 is a side view indicating the three component parts of the novel tiles.

The tile to be described for the purposes of illustrating the invention is shown in perspective view in FIGURE 2 as consisting of one ply of linoleum tile and one ply of release paper between which is a flat body of the novel bituminous composition which will impart considerable vapor impermeation to the novel combination tile.

The tile as illustrated in this embodiment is of a material commonly referred to as linoleum, which consists of a binder or cement of oxidized drying oils or resins filled with combinations of filler or pigments. The release paper is a silicone treated paper.

Figure 3:
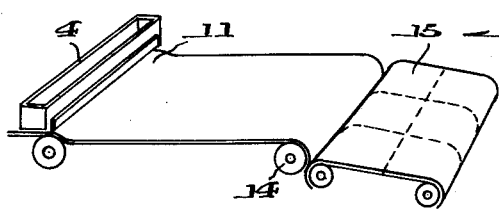
FIGURE 3 is a sectional view showing a hopper releasing the pitch composition onto the removable release paper and the subsequent application of a tile material to the adhesive.

As shown diagramatically in FIGURE 3, the bituminous composition continuously fed from a hopper or other container flows onto a continuously moving sheet of release paper 11 which coated paper passes over a pair of rollers 14 and 15 to be then contacted with the tile material. If desired, the tile may be vinyl, rubber, asphalt, cork, and the like, and the bituminous adhesive and release paper may be applied to this tile in the manner hereinbefore described. The thus completed linoleum or other floor covering may then be sliced longitudinally to form two transverse tile sections or, if singular tiles are desired, these sections can be cut to form individual tiles as indicated in FIGURE 3.

The temperature and the pressure at which the tile, bituminous adhesive and release paper are compressed together is not critical and will depend upon the character of the material used as the tile and upon the temperature at which the bituminous composition will flow readily.

The thickness of the bituminous composition material interposed between the upper tile and the release paper can be varied according to the type of surface to be covered. For example, if a concrete floor having voids throughout is to be covered, an adhesive layer of ¼ inch could be interposed between the tile and the release paper.

Several tiles using the adhesive composition as described in Example 3 of the copending application Serial No. 76,185 of John J. Lane and Lawrence F. Flaherty filed concurrently herewith were made in accordance with the process as hereinbefore described. Several tiles were also made using the adhesive composition as described in Example 1 of the copending application Serial No. 76,357 of John J. Lane and B. Otto Wheeley. These tiles were used to cover a concrete floor in the basement of a residential building. By simply removing the release paper from the adhesive, the tiles were placed in position and the covered concrete floor was ready for immediate use. No drying time was necessary because the adhesive compositions secured a permanent bond to the concrete immediately upon contact.

The foregoing has presented a novel self-adhering floor tile which is particularly suitable for a quick, neat application of decorative tiles to any surface. The bituminous composition creates a water free bond between the lower surface of the combination tile and the substrate which is to be covered. The tile can be easily applied to any surface without the need of special tools and separate cement whereby simply by removing the outer release paper, the tile is ready to be put in place on any surface.

I claim:

1. A decorative adhesive vapor-proofing floor and wall surface tile, comprising a tile coated on the underside with a self-adhesive coal tar pitch composition, which comprises: a solution of coal and copolymer of acrylonitrile and butadiene in a mixture of coal-tar pitch and heavy creosote oil; the outer surface of said coal tar pitch composition layer being protected by a release paper.

2. An article of manufacture comprising a self-adhering decorative floor and wall tile material having a natural adhesive coating on said tile material's underside said adhesive coating resulting from the application thereto of a coal-tar pitch composition comprised of a solution of coal and copolymer of acrylonitrile and butadiene in a mixture of coal tar pitch and heavy creosote oil which pitch composition is protected prior to use by a release paper.

3. A decorative adhesive vapor-proofing floor and wall surface tile, comprising a tile coated on the underside with a self-adhesive asphalt composition, which comprises: asphalt, butyl-rubber and a high boiling petroleum oil; the outer surface of said asphalt composition layer being protected prior to use by a release paper.

4. An article of manufacture comprising a self-adhering decorative floor and wall tile material having a natural adhesive coating on said tile material's underside said adhesive coating resulting from the application thereto of an asphalt composition comprised of asphalt, butyl rubber and a high boiling petroleum oil which asphalt composition is protected prior to use by a release paper.

5. A decorative adhesive vapor-proofing surface floor and wall tile, comprising a tile selected from the group consisting of linoleum, polyvinyl chloride, rubber, asphalt, cork, and ceramics which tile is coated on the underside with a self-adhering coal-tar pitch composition comprised of a mixture of 1%–25% copolymer of acrylonitrile and butadiene, 10%–40% coal, 25%–65% heavy creosote oil and 10%–44% coal-tar pitch; the outer surface of said adhesive layer being protected by a silicone treated film.

6. A decorative adhesive vapor-proofing surface floor and wall tile, comprising a tile selected from the group consisting of linoleum, polyvinyl chloride, rubber, asphalt, cork, and ceramics which tile is coated on the underside with a self-adhering asphalt composition comprised of 40%–80% asphalt, 2%–25% butyl-rubber, 2%–25% high boiling petroleum oil and 0%–30% filler material, the outer surface of said adhesive layer being protected by a silicone treated film.

7. A method of decorating a surface, which includes: providing a preformed floor and wall tile, a coal-tar pitch adhesive composition comprised of a solution of coal and copolymer of acrylonitrile and butadiene in a mixture of coal tar pitch and heavy creosote oil, and a release paper, whereby the tile being bonded on one surface to the adhesive composition, and after removal of said release paper, is immediately set in position upon a contacting surface forming an instant bond.

8. A method of decorating a surface, which includes: providing a preformed floor and wall tile, an asphalt adhesive composition comprised of asphalt, butyl rubber and a high boiling petroleum oil, and a release paper, whereby the tile being bonded on one surface to the adhesive composition, and after removal of said release paper, is immediately set in position upon a contacting surface forming an instant bond.

9. A method of decorating a floor and wall surface which includes: providing a preformed tile selected from the group consisting of linoleum, polyvinyl chloride, rubber, asphalt, cork, and ceramics, an asphalt adhesive composition comprised of 40%–80% asphalt, 2%–25% rubber, 2%–25% high boiling petroleum oil and 0%–30% filler material, and a silicone treated release film whereby the tile being bonded on one surface to the adhesive composition and after removal of said release film is immediately set in position upon a contacting surface forming an instant bond.

10. A method of decorating a floor and wall surface which includes: providing a preformed tile selected from the group consisting of linoleum, polyvinyl chloride, rubber, asphalt, cork, and ceramics, a coal-tar pitch adhesive composition comprised of 1%–15% copolymer of acrylonitrile and butadiene, 10%–40% coal, 25%–65% heavy creosote oil and 10%–44% coal-tar pitch, and a silicone treated release film whereby the tile being bonded on one surface to the adhesive composition and after removal of said release film is immediately set in position upon a contacting surface forming an instant bond.

References Cited in the file of this patent

UNITED STATES PATENTS

| | | |
|---|---|---|
| 1,852,696 | Chaffee | Apr. 5, 1932 |
| 2,529,799 | Crockett | Nov. 14, 1950 |
| 2,572,877 | Morris et al. | Oct. 30, 1951 |
| 2,863,405 | Leibrook et al. | Dec. 9, 1958 |
| 2,878,666 | Drummond | Mar. 24, 1959 |
| 2,953,475 | Bergstedt et al. | Sept. 20, 1960 |